(12) United States Patent
Choi

(10) Patent No.: US 12,170,475 B2
(45) Date of Patent: Dec. 17, 2024

(54) ROTOR ASSEMBLY HAVING SHAFT WITH COOLING HOLES SUPPORT FLANGE WITH COOLING HOLES

(71) Applicant: HYUNDAI MOBIS Co., Ltd., Seoul (KR)

(72) Inventor: Jin Woo Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 629 days.

(21) Appl. No.: 17/473,392

(22) Filed: Sep. 13, 2021

(65) Prior Publication Data
US 2022/0376587 A1 Nov. 24, 2022

(30) Foreign Application Priority Data
May 20, 2021 (KR) ........................ 10-2021-0064733

(51) Int. Cl.
*H02K 9/19* (2006.01)
*H02K 5/12* (2006.01)
*H02K 5/16* (2006.01)

(52) U.S. Cl.
CPC ............... *H02K 9/19* (2013.01); *H02K 5/12* (2013.01); *H02K 5/163* (2013.01)

(58) Field of Classification Search
CPC ...... H02K 2205/09; H02K 9/005; H02K 9/19; H02K 9/10; H02K 7/003; H02K 9/193;
(Continued)

(56) References Cited

U.S. PATENT DOCUMENTS 3,189,769 A * 6/1965 Willyoung ............. H02K 9/225
310/52
3,462,625 A * 8/1969 Endress .................... H02K 1/32
310/61
(Continued)

FOREIGN PATENT DOCUMENTS

JP 2010-220340 A 9/2010
JP 2020-145782 A 9/2020
(Continued)

OTHER PUBLICATIONS

Office Action issued in corresponding Korean Patent Application No. 10-2021-0064733 dated Jan. 13, 2023, with English translation.

*Primary Examiner* — Maged M Almawri
(74) *Attorney, Agent, or Firm* — MORGAN, LEWIS & BOCKIUS LLP

(57) ABSTRACT

According to an aspect of the present disclosure, a rotor assembly includes a rotor core having a through-hole disposed at a central portion thereof along an axial direction of the rotor core, and a rotor shaft that passes through the through-hole and coupled to the rotor core, the rotor shaft includes a shaft body having a hollow portion in an interior thereof, a cooling fluid hole part including a plurality of cooling holes passing through the shaft body to discharge a cooling fluid introduced through the hollow portion to an outside of the shaft body and arranged to be spaced apart from each other along an axial direction of the shaft body, and a support flange protruding radially on an outer surface of the shaft body to restrain axial movement of the rotor core and having a passage communication hole.

15 Claims, 12 Drawing Sheets

(58) Field of Classification Search
CPC ...... H02K 9/16–197; H02K 1/32; H02K 5/12;
H02K 5/15; H02K 5/163; H02K 5/20;
H02K 7/085; H02K 7/02; H02K 7/025;
F16F 15/30; F16F 15/302; Y02E 60/16
USPC ............. 310/74, 52, 54, 57, 62, 63, 64, 153,
310/216.119
See application file for complete search history.

(56) References Cited

U.S. PATENT DOCUMENTS

| | | | | |
|---|---|---|---|---|
| 3,521,094 | A * | 7/1970 | Widder | H02K 9/197 310/58 |
| 4,203,044 | A * | 5/1980 | Linscott, Jr. | F16C 3/00 310/68 D |
| 4,303,842 | A * | 12/1981 | Nathenson | H02K 3/22 310/201 |
| 4,315,172 | A * | 2/1982 | Intichar | H02K 9/225 310/64 |
| 4,467,229 | A * | 8/1984 | Ogita | H02K 9/12 310/157 |
| 5,189,325 | A * | 2/1993 | Jarczynski | H02K 9/197 310/61 |
| 5,424,593 | A * | 6/1995 | Vaghani | H02K 11/042 310/68 D |
| 6,232,691 | B1 * | 5/2001 | Anderson | H02K 29/10 310/179 |
| 6,734,585 | B2 * | 5/2004 | Tornquist | H02K 1/325 310/58 |
| 6,750,572 | B2 * | 6/2004 | Tornquist | H02K 9/19 310/58 |
| 6,897,581 | B2 * | 5/2005 | Doherty | H02K 19/38 310/59 |
| 7,489,057 | B2 * | 2/2009 | Zhou | H02K 9/197 310/61 |
| 8,004,140 | B2 * | 8/2011 | Alexander | H02K 1/2773 310/216.057 |
| 8,080,908 | B2 * | 12/2011 | Matsubara | H02K 1/32 310/156.53 |
| 8,786,154 | B2 * | 7/2014 | Kim | H02K 1/276 310/156.09 |
| 8,970,074 | B2 * | 3/2015 | Wagner | H02K 7/003 310/59 |
| 10,135,319 | B2 * | 11/2018 | Hanumalagutti | B60K 1/00 |
| 10,326,334 | B2 * | 6/2019 | Larjola | H02K 7/1823 |
| 10,630,134 | B2 * | 4/2020 | Goldstein | H02K 5/203 |
| 10,826,363 | B2 * | 11/2020 | Huang | H02K 15/0407 |
| 11,056,950 | B2 * | 7/2021 | Jung | H02K 1/32 |
| 11,418,077 | B2 * | 8/2022 | Krais | H02K 7/003 |
| 2003/0030333 | A1 * | 2/2003 | Johnsen | H02K 1/32 310/54 |
| 2004/0080218 | A1 * | 4/2004 | Weidman | H02K 1/32 310/61 |
| 2006/0082228 | A1 * | 4/2006 | Urbahn | H02K 9/20 62/50.7 |
| 2009/0261667 | A1 * | 10/2009 | Matsubara | H02K 1/2766 310/54 |
| 2012/0205996 | A1 * | 8/2012 | Buttner | H02K 9/225 310/54 |
| 2012/0213460 | A1 * | 8/2012 | Radinger | F16C 19/54 384/477 |
| 2012/0299404 | A1 * | 11/2012 | Yamamoto | H02K 1/28 310/61 |
| 2013/0002064 | A1 * | 1/2013 | De Bock | H02K 9/197 310/54 |
| 2013/0038151 | A1 * | 2/2013 | Ohashi | H02K 7/086 310/59 |
| 2013/0057117 | A1 * | 3/2013 | Suzuki | B60K 7/0007 310/60 R |
| 2013/0221772 | A1 * | 8/2013 | Miyamoto | H02K 9/19 310/54 |
| 2013/0257196 | A1 * | 10/2013 | Yamamoto | H02K 9/19 310/54 |
| 2013/0313938 | A1 * | 11/2013 | Yamada | H02K 16/02 310/156.69 |
| 2013/0334912 | A1 * | 12/2013 | Tokunaga | H02K 9/19 310/54 |
| 2014/0042841 | A1 * | 2/2014 | Rippel | H02K 9/193 310/54 |
| 2014/0124172 | A1 * | 5/2014 | Veltri | H02K 5/203 165/104.19 |
| 2014/0333163 | A1 * | 11/2014 | Horii | H02K 9/10 310/59 |
| 2015/0042185 | A1 * | 2/2015 | Buttner | H02K 9/193 310/54 |
| 2015/0288255 | A1 * | 10/2015 | Barker | H02K 1/2781 310/43 |
| 2016/0036276 | A1 * | 2/2016 | Yamagishi | H02K 1/22 310/59 |
| 2016/0301268 | A1 * | 10/2016 | Watanabe | H02K 1/2706 |
| 2018/0198331 | A1 * | 7/2018 | Sano | H02K 1/276 |
| 2019/0068012 | A1 * | 2/2019 | Yazaki | H02K 9/19 |
| 2019/0207447 | A1 * | 7/2019 | Swales | H02K 1/2766 |
| 2019/0267859 | A1 * | 8/2019 | Kitahara | H02K 1/276 |
| 2020/0036249 | A1 * | 1/2020 | Krais | H02K 9/197 |
| 2020/0136451 | A1 * | 4/2020 | Zeichfüssl | F03D 9/25 |
| 2020/0153296 | A1 * | 5/2020 | Albieri | H02K 1/2766 |
| 2020/0186007 | A1 * | 6/2020 | Kitao | H02K 15/03 |
| 2020/0274411 | A1 * | 8/2020 | Kimoto | H02K 1/276 |
| 2020/0282822 | A1 * | 9/2020 | Oh | H02K 7/085 |
| 2020/0328657 | A1 * | 10/2020 | Jung | H02K 11/21 |
| 2020/0366158 | A1 * | 11/2020 | Morishita | B62D 5/0403 |
| 2021/0111614 | A1 * | 4/2021 | Fratila | H02K 1/16 |
| 2021/0119508 | A1 * | 4/2021 | Remboski | H02K 1/14 |
| 2021/0135533 | A1 * | 5/2021 | Samie | H02K 1/276 |

FOREIGN PATENT DOCUMENTS

| | | |
|---|---|---|
| KR | 10-2018-0026093 A | 3/2018 |
| KR | 10-2018229 B1 | 9/2019 |
| KR | 10-2020-0120258 A | 10/2020 |

* cited by examiner

ROTOR ASSEMBLY HAVING SHAFT WITH COOLING HOLES SUPPORT FLANGE WITH COOLING HOLES

CROSS-REFERENCE TO RELATED APPLICATION

This application claims the benefit of priority to Korean Patent Application No. 10-2021-0064733, filed in the Korean Intellectual Property Office on May 20, 2021, the entire contents of which are incorporated herein by reference.

TECHNICAL FIELD

The present disclosure relates to a rotor assembly and a motor including the same, and more particularly, to a rotor assembly that improves the cooling efficiency of an oil cooling type motor, and a motor including the same.

BACKGROUND

A driving motor is configured to generate a rotational force when electric power is supplied thereto, and has various structures. For example, a driving motor used for an electric vehicle may include a housing, a stator installed in an interior of the housing, and a rotor integrally coupled to a rotary shaft in an interior of the stator. When a current is applied to a stator coil installed in the stator, an induced current is generated in the rotor and a rotational force is generated as the rotor is rotated.

A heat emitting source of the driving motor is the stator coil, in which a current flows, and a rotor core, in which a magnetic flux flows. When the driving motor is operated, the temperatures of the corresponding components increases and their functions may become abnormal if the increase of the temperature is excessive. Accordingly, it is important to efficiently cool the heat generated by the motor.

The schemes for cooling the heat generated by the motor include an oil cooling scheme of directly supplying an oil to a heat emitting source, a water cooling scheme of indirectly cooling a heat emitting source by causing cooling water to flow in a housing passage.

A conventional oil cooling scheme is a scheme of installing a pipe for supplying an oil into an interior of a housing, and ejecting the oil from a pipe to directly cool a stator coil and a stator coil. However, according to the conventional oil cooling scheme, opposite axial ends of a stator core installed adjacent to the pipe and the stator coil are advantageously cooled, but an area that is difficult to be directly cooled through an oil is caused, and accordingly, cooling efficiency may deteriorate. For example, a middle area of the stator core or a part of a rotor core are covered by an end plate or a coil so that it is difficult to directly cool them by the coil ejected from the pipe.

Accordingly, it is necessary to improve technologies for efficiently cooling parts that are difficult to be directly cooled by the current oil cooling scheme.

SUMMARY

The present disclosure has been made to solve the above-mentioned problems occurring in the prior art while advantages achieved by the prior art are maintained intact.

An aspect of the present disclosure provides a rotor assembly that may directly cool parts that are difficult to be directly cooled by a cooling fluid in an existing oil cooling system without adding a separate part through improvement of the structures of a rotor core and a rotor shaft, and a motor including the same.

Another aspect of the present disclosure provides a rotor assembly that may increase cooling efficiency, increasing the efficiency of a motor, and thus decrease the specification of a magnet, thereby reducing manufacturing costs, and a motor including the same.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a rotor assembly includes a rotor core having a through-hole disposed at a central portion thereof along an axial direction of the rotor core, and a rotor shaft that passes through the through-hole and coupled to the rotor core. The rotor shaft includes a shaft body having a hollow portion in an interior thereof, a cooling fluid hole part including a plurality of cooling holes passing through the shaft body to discharge a cooling fluid introduced through the hollow portion to an outside of the shaft body and arranged to be spaced apart from each other along an axial direction of the shaft body, and a support flange protruding radially on an outer surface of the shaft body to restrain axial movement of the rotor core and having a passage communication hole. The rotor core includes a rotor cooling passage extending in the axial direction of the rotor core, communicating with some of the plurality of cooling holes, that passes through the passage communication hole, and configured such that the cooling fluid flows therethrough.

The rotor core may include a plurality of divided core bodies stacked along the axial direction of the rotor core and that forms the rotor cooling passage in a state, in which the plurality of divided core bodies are stacked, and the support flange may be interposed between adjacent ones of the plurality of divided core bodies.

The cooling fluid hole part may include first cooling holes disposed at locations corresponding to one axial end of the rotor core and communicating with the rotor cooling passage, and second cooling holes disposed at an opposite side of the first cooling holes, spaced apart from the first cooling holes, and disposed at a location corresponding to the support flange.

The first cooling holes may be spaced apart from one another along a circumferential direction of the shaft body, and the second cooling holes may be spaced apart from one another along the circumferential direction of the shaft body.

The support flange may include a support body having the passage communication hole, and a passage part having a cut shape at a portion of the support body, and extending radially from the shaft body to communicate with the second cooling holes, and the rotor core may further include a stator cooling passage extending radially between the adjacent ones of the plurality of divided core bodies, disposed in an area corresponding to the passage part, and configured such that the cooling fluid discharged through the second cooling holes flow radially.

The rotor assembly may further include a first end plate that covers the one axial end of the rotor core, and a second end plate that covers an opposite axial end of the rotor core.

The first end plate may include an inlet hole communicating with the first cooling holes, and a first passage groove having a concave shape on a surface that faces the rotor core, disposed along a circumferential direction of the rotor shaft, connected to the inlet hole, and communicating with the rotor cooling passage.

The second end plate includes a first surface, which faces the rotor core, and a second surface, which is an opposite surface to the first surface. The second end plate may include a second passage groove having a concave shape on the first surface of the second end plate, disposed along the circumferential direction of the rotor shaft, and communicating with the rotor cooling passage, and a discharge hole penetrating the second end plate and extending between the second passage groove and the second surface to discharge the cooling fluid introduced into the second passage groove.

The discharge hole may be inclined to be farther away from the rotor shaft as the discharge hole extends from the second passage groove in a direction toward the second surface.

The cooling fluid hole part may include third cooling holes disposed on one side of the first cooling holes, spaced apart from the first cooling holes, and fourth cooling holes disposed between the first cooling holes and the third cooling holes.

The third cooling holes may be spaced apart from one another along a circumferential direction of the shaft body, and the fourth cooling holes may be spaced apart from one another along the circumferential direction of the shaft body.

According to another aspect of the present disclosure, a motor includes a housing, a stator disposed in an interior of the housing, and a rotor assembly housed on an inside of the stator to be rotatable, the rotor assembly includes a rotor core having a through-hole disposed at a central portion thereof along an axial direction of the rotor core, and a rotor shaft that passes through the through-hole and coupled to the rotor core. The rotor shaft includes a shaft body having a hollow portion in an interior thereof, a cooling fluid hole part including a plurality of cooling holes passing through the shaft body to discharge a cooling fluid introduced through the hollow portion to an outside of the shaft body and arranged to be spaced apart from each other along an axial direction of the shaft body, and a support flange protruding radially on an outer surface of the shaft body to restrain axial movement of the rotor core and having a passage communication hole. The rotor core includes a rotor cooling passage extending in the axial direction of the rotor core, communicating with some of the plurality of cooling holes, that passes through the passage communication hole, and configured such that the cooling fluid flows therethrough.

The support flange may include a support body having the passage communication hole, and a passage part having a cut shape at a portion of the support body, and extending radially from the shaft body to communicate with some of the plurality of cooling holes. The rotor core may further include a plurality of divided core bodies stacked along the axial direction of the rotor core and that forms the rotor cooling passage in a state, in which the plurality of divided core bodies are stacked, and a stator cooling passage extending radially between adjacent ones of the plurality of divided core bodies, disposed in an area corresponding to the passage part, and configured such that the cooling fluid discharged through some of the cooling holes flows radially.

The motor may further include a coil part disposed in an interior of the stator, some of the plurality of cooling holes may be disposed at a location corresponding to one end of the coil part, and the cooling fluid flowing through the rotor cooling passage may be discharged toward an opposite end of the coil part.

The motor may further include a bearing member mounted on one end of the rotor shaft, and some of the plurality of cooling holes may be disposed at a location corresponding to the bearing member.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described herein are embodiments that are suitable for understanding the technical features of a rotor assembly and a motor including the same according to the present disclosure. However, the present disclosure is not limited to the embodiment described below or the technical features of the present disclosure are not limited by the described embodiments, and the present disclosure may be variously modified without departing from the technical scope of the present disclosure.

Figure 1:
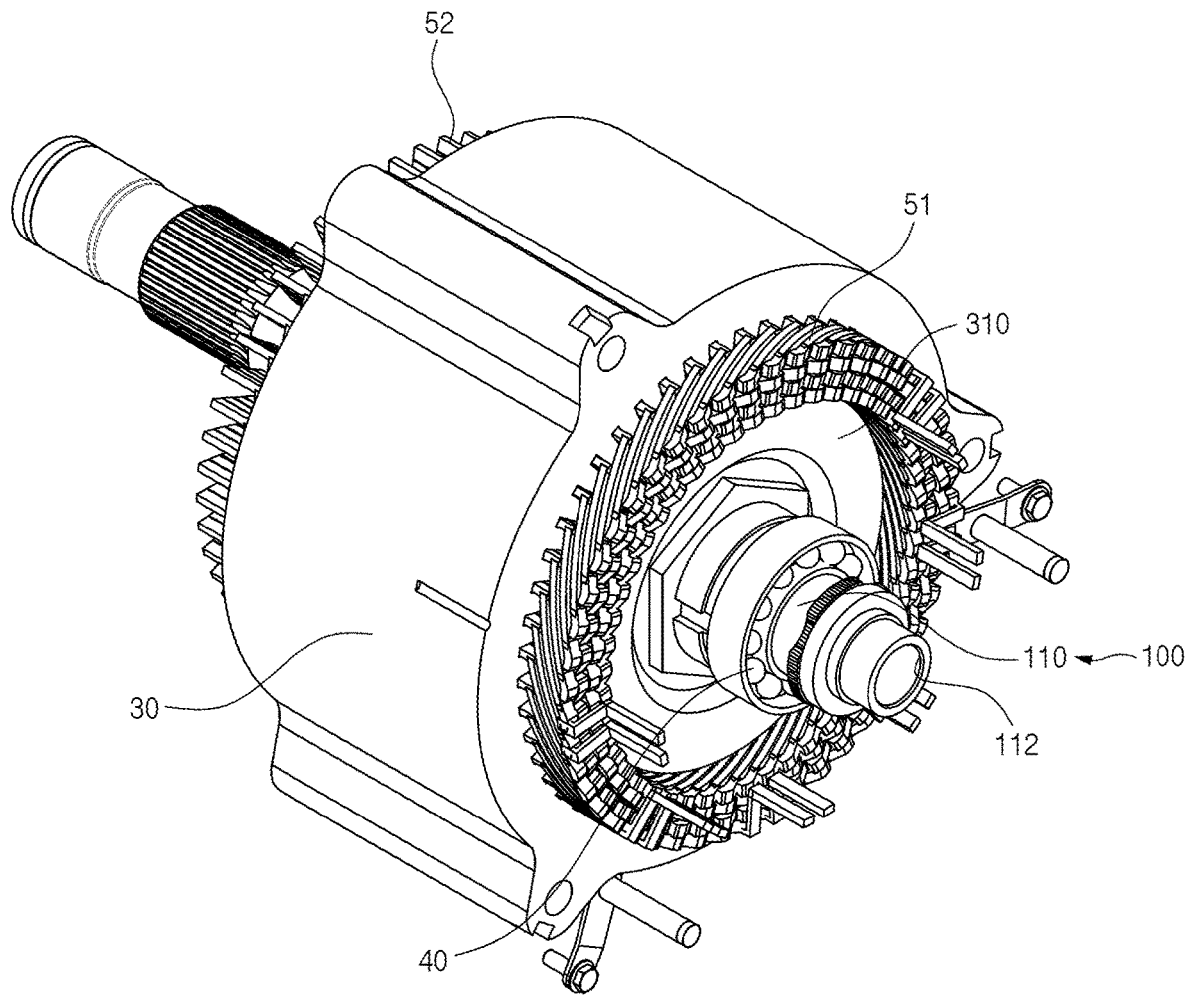
FIG. 1 is a perspective view illustrating a motor including a rotor assembly according to an embodiment of the present disclosure.
Figure 2:
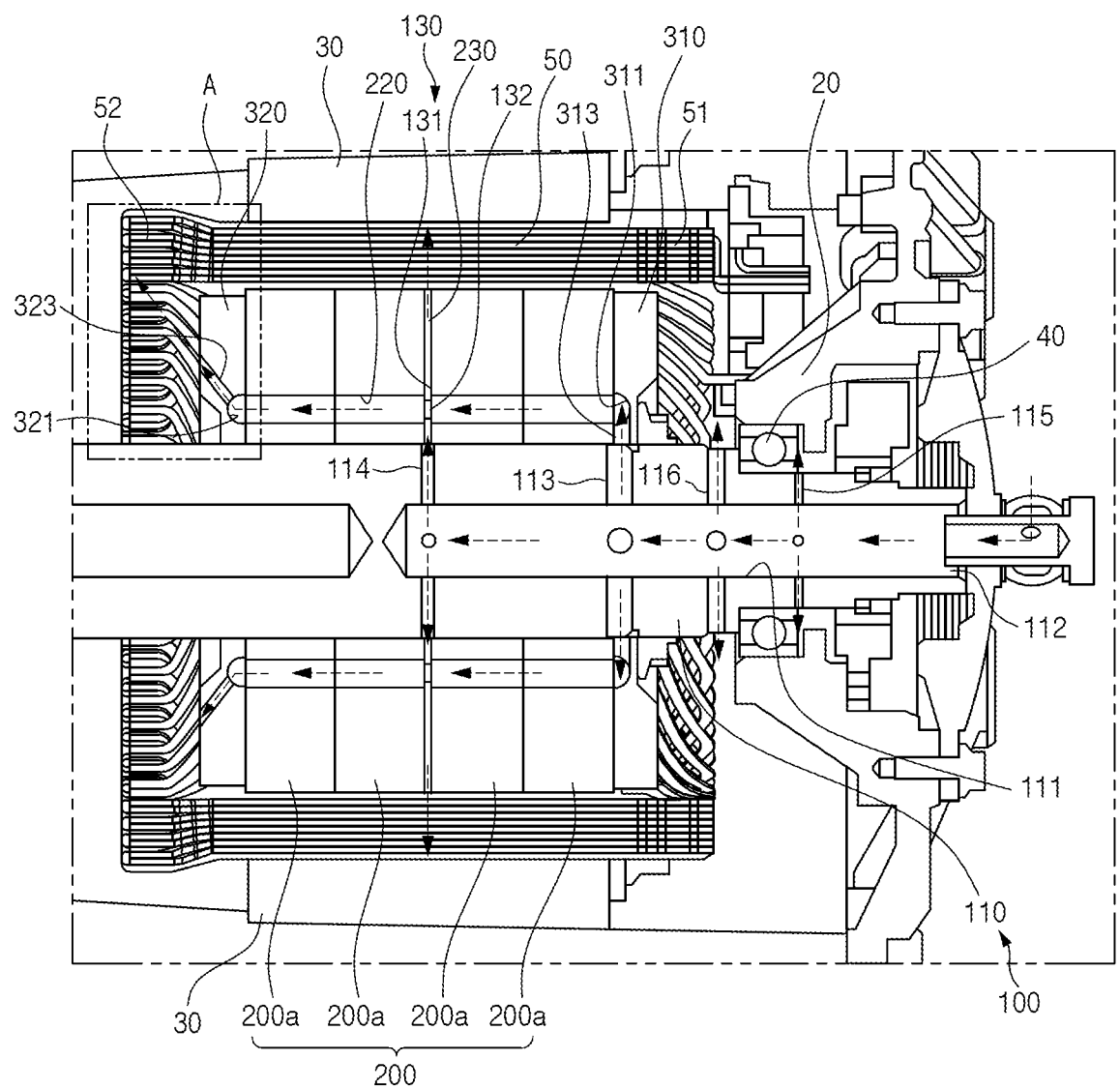
FIG. 2 illustrates a motor including a rotor assembly according to an embodiment of the present disclosure, and is a cross-sectional view of FIG. 1.
Figure 3:
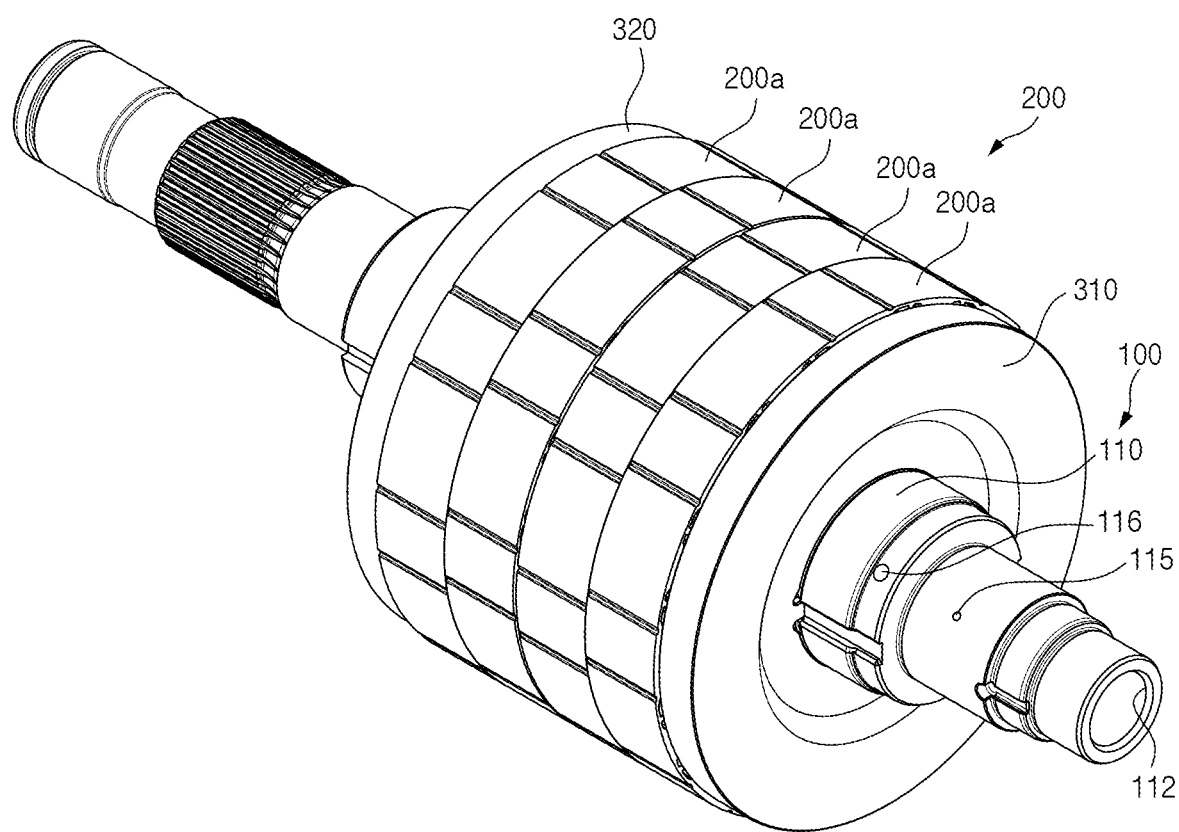
FIG. 3 is a perspective view illustrating a rotor assembly according to an embodiment of the present disclosure.
Figure 4:
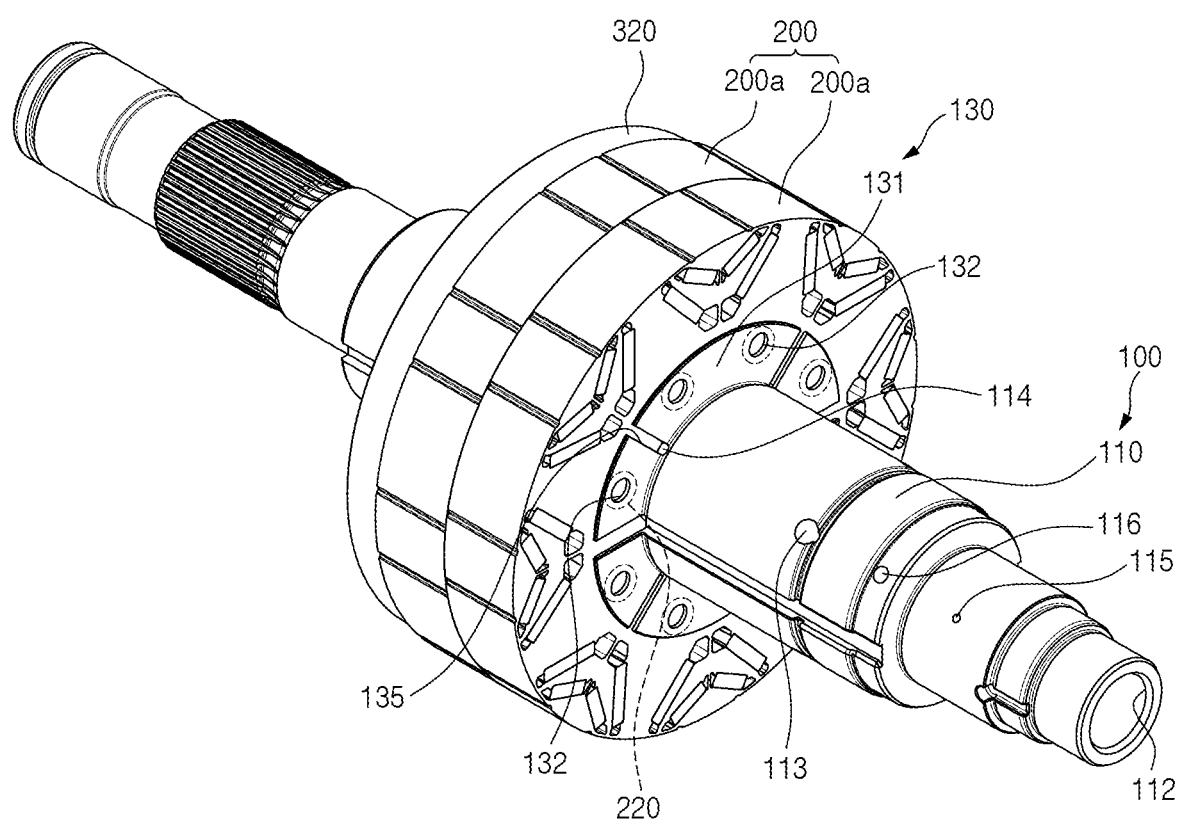
FIG. 4 is a perspective view illustrating a state, in which a first end plate and some of divided core bodies are removed from the rotor assembly of FIG. 3.
Figure 5:
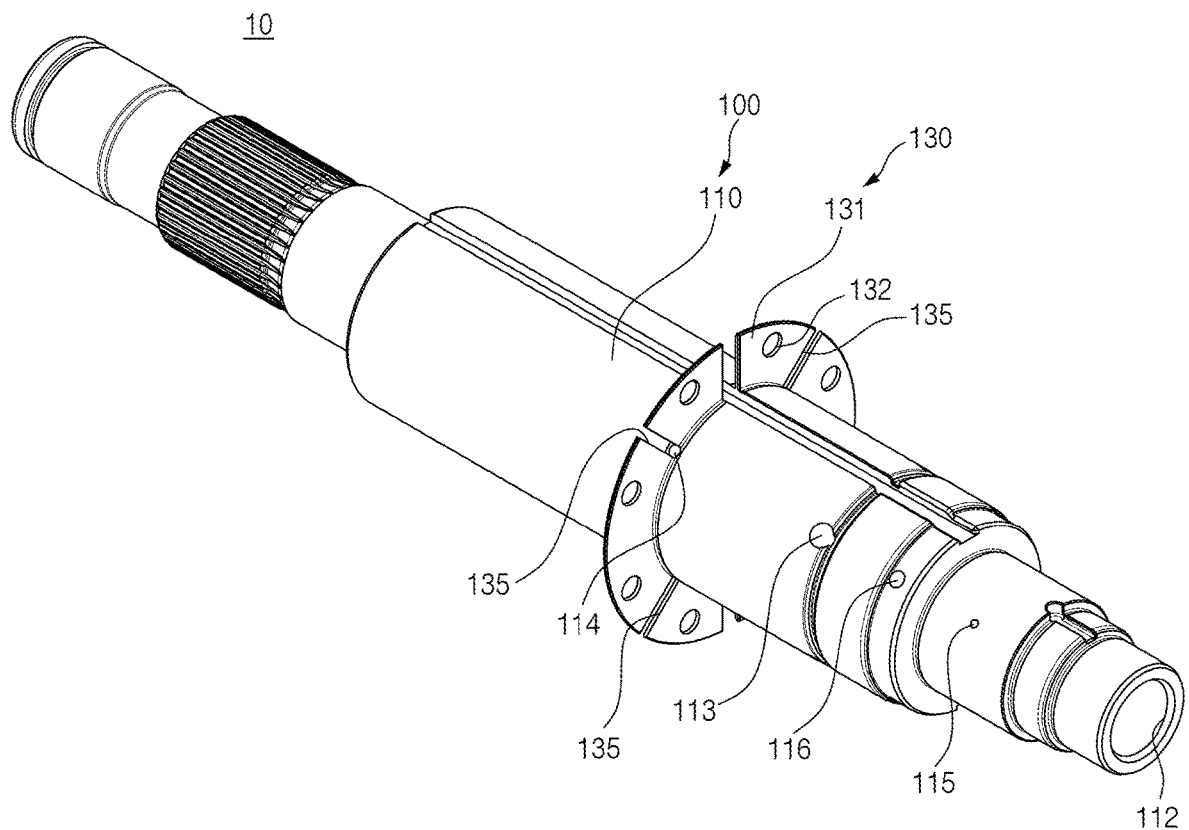
FIG. 5 is a perspective view illustrating a rotor shaft according to an embodiment of the present disclosure.
Figure 6:
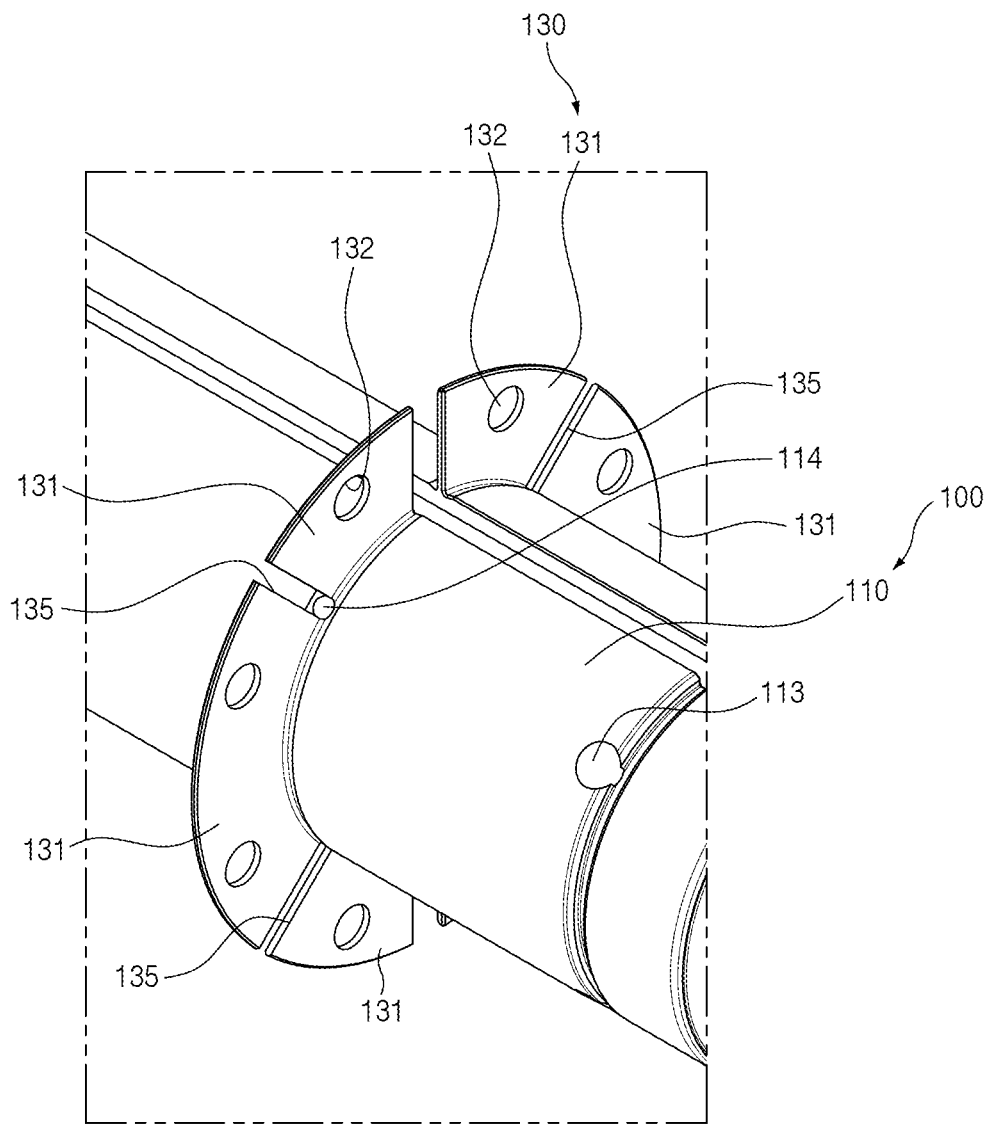
FIG. 6 is a view illustrating a support flange according to an embodiment of the present disclosure, and is an enlarged perspective view of a portion of FIG. 5.
Figure 7:
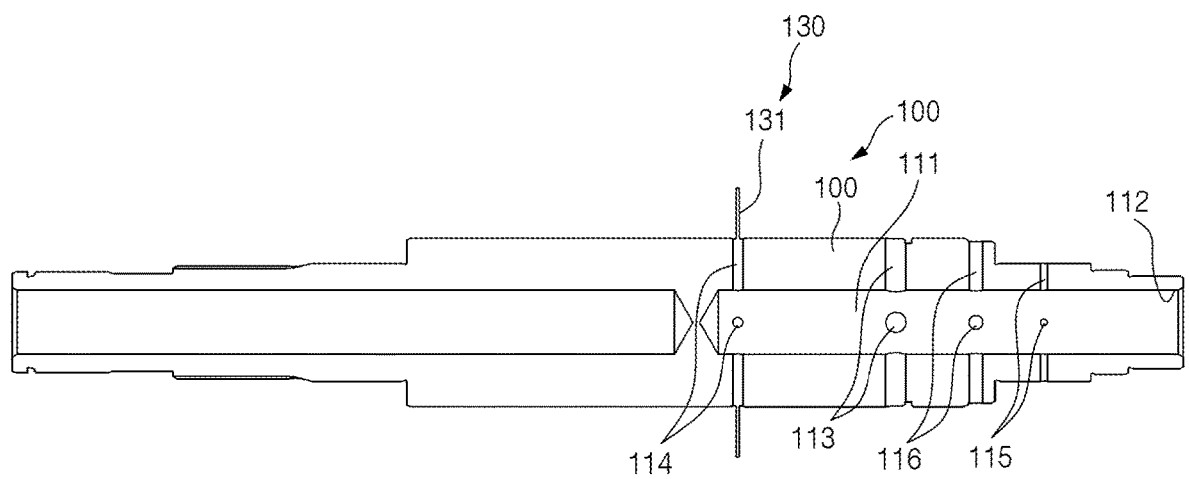
FIG. 7 is a cross-sectional view of a rotor shaft according to an embodiment of the present disclosure.
Figure 8:
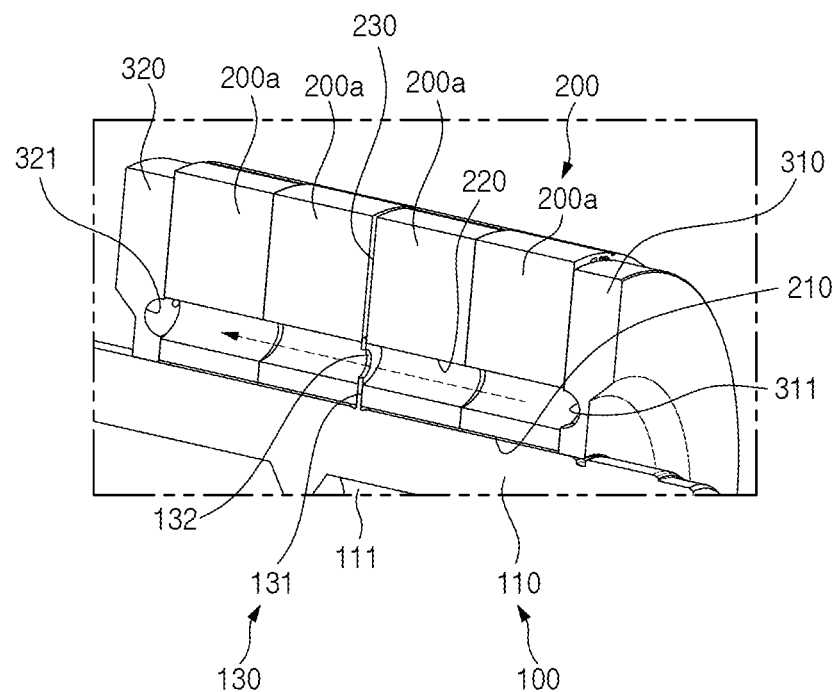
FIG. 8 is a view illustrating a rotor core according to an embodiment of the present disclosure, and is a partially enlarged cross-sectional perspective view of a portion of FIG. 3.
Figure 9:
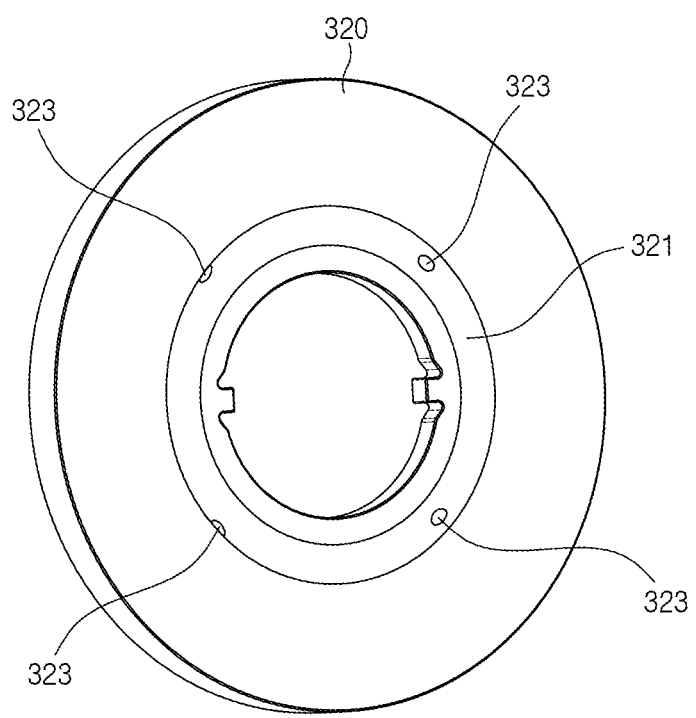
FIG. 9 is a view illustrating a second end plate according to an embodiment of the present disclosure, and is a perspective view when a first surface is viewed.
Figure 10:
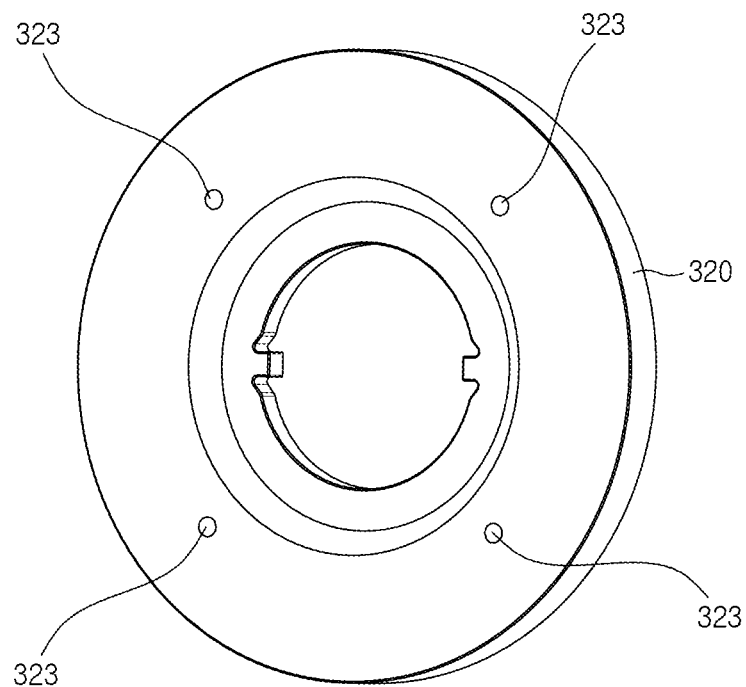
FIG. 10 is a view illustrating a second end plate according to an embodiment of the present disclosure, and is a perspective view when a second surface is viewed.
Figure 11:
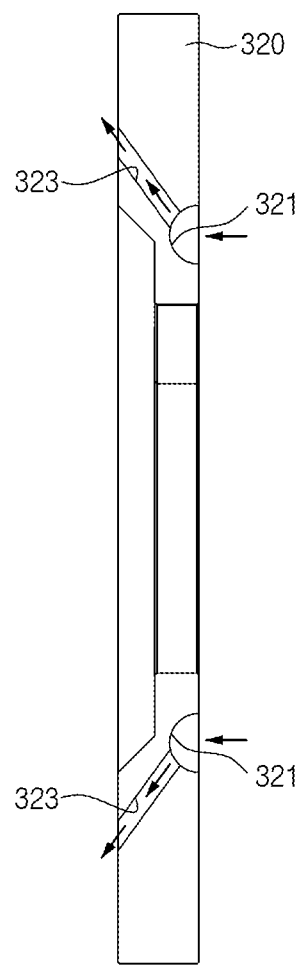
FIG. 11 is a cross-sectional view of a second end plate according to an embodiment of the present disclosure.
Figure 12:
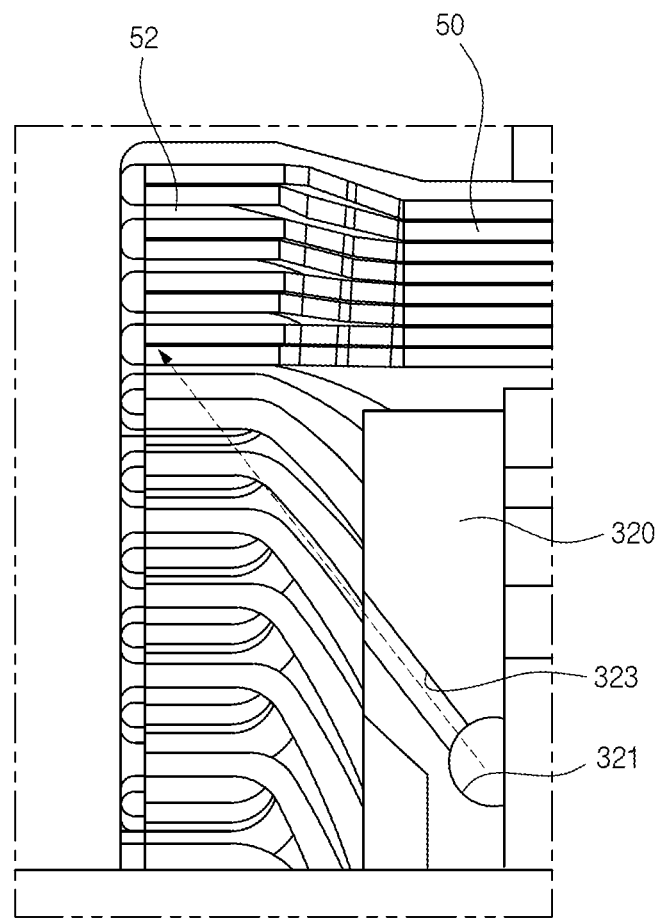
FIG. 12 is an enlarged cross-sectional view of portion A of FIG. 2.

FIG. 1 is a perspective view illustrating a motor including a rotor assembly according to an embodiment of the present disclosure. FIG. 2 illustrates a motor including a rotor assembly according to an embodiment of the present disclosure, and is a cross-sectional view of FIG. 1. FIG. 3 is a perspective view illustrating a rotor assembly according to an embodiment of the present disclosure. FIG. 4 is a perspective view illustrating a state, in which a first end plate and some of divided core bodies are removed from the rotor assembly of FIG. 3. FIG. 5 is a perspective view illustrating a rotor shaft according to an embodiment of the present disclosure. FIG. 6 is a view illustrating a support flange according to an embodiment of the present disclosure, and is an enlarged perspective view of a portion of FIG. 5. FIG. 7 is a cross-sectional view of a rotor shaft according to an embodiment of the present disclosure. FIG. 8 is a view illustrating a rotor core according to an embodiment of the present disclosure, and is a partially enlarged cross-sectional perspective view of a portion of FIG. 3. FIG. 9 is a view illustrating a second end plate according to an embodiment of the present disclosure, and is a perspective view when a first surface is viewed. FIG. 10 is a view illustrating a second end plate according to an embodiment of the present disclosure, and is a perspective view when a second surface is viewed. FIG. 11 is a cross-sectional view of a second end plate according to an embodiment of the present disclosure. FIG. 12 is an enlarged cross-sectional view of portion A of FIG. 2.

Referring to FIGS. 1 to 12, a motor 1 including a rotor assembly 10 according to an embodiment of the present disclosure includes a housing 20, a stator 30, and the rotor assembly 10. Further, the motor 1 may further include a coil part 50 and a bearing member 40.

The housing 20 has a space in an interior thereof, and a plurality of components may be installed in the space.

The stator 30 is disposed in the interior of the housing 20. For example, the stator 30 may be installed in a state while being fixed in the interior of the housing 20.

The coil part 50 may be provided in the interior of the stator 30. For example, the coil part 50 may be wound on the stator and may be magnetized when a power source is applied thereto. Hereinafter, for convenience of description, one end of the coil part 50 will be referred to as one side coil end 51 and an opposite end of the coil part 50 will be referred to as an opposite side coil end 52 with respect to an axial direction of the stator 30.

The rotor assembly 10 may be installed in the interior of the stator 30 to be rotatable. In more detail, an induced current may be generated in the rotor assembly 10, and accordingly, the rotor assembly 10 may be rotated relatively with respect to the stator 30.

The bearing member 40 may be mounted to one end of a rotor shaft 100 provided in the rotor assembly 10. In detail, the bearing member 40 is mounted between the rotor shaft 100 and the housing (or housing cover) 20, and may support rotation of the rotor shaft 100.

The rotor assembly 10 includes a rotor core 200, in which a through-hole 210 is formed at a central portion thereof in an axial direction thereof, and the rotor shaft 100 that passes through the through-hole 210 to be coupled to the rotor core 200.

The rotor shaft 100 includes a shaft body 110 having a hollow portion 111 in an interior thereof, a cooling fluid hole part including a plurality of cooling holes 113, 114, 115, and 116 that pass through the shaft body 110 to discharge a cooling fluid introduced through the hollow portion 111 to an outside of the shaft body 110 and are arranged to be spaced apart from each other along an axial direction of the shaft body 110, and a support flange 130 that protrudes radially on an outer surface of the shaft body 110 to restrain axial movement of the rotor core 200 and has a passage communication hole 132.

Here, the rotor core 200 includes a rotor cooling passage 220 that extends in an interior thereof in the axial direction of the rotor core 200, communicates with some of the plurality of cooling holes, and passes through the passage communication hole 132, and is configured such that the cooling fluid flows therethrough.

Furthermore, some of the plurality of cooling holes may be formed at a location corresponding to the one side coil end 51 that is the one end of the coil part 50. Furthermore, the cooling fluid that flows through the rotor cooling passage 220 may be discharged toward the opposite side coil end 52 that is the opposite end of the coil part 50.

Hereinafter, the rotor assembly 10 according to the embodiment of the present disclosure will be described with reference to FIGS. 1 to 12.

Referring to FIGS. 1 to 12, the rotor assembly 10 according to the embodiment of the present disclosure includes the rotor core 200 and the rotor shaft 100.

The through-hole 210 that passes through the rotor core 200 is formed at a central portion of the rotor core 200 in the axial direction of the rotor core 200. The rotor core 200 is rotated by an induced current when a current is applied to a coil of the stator 30. The rotor core 200 is rotated by an induced current generated when a current is applied to the coil part 50.

The rotor shaft 100 may have a hollow portion 111 which passes through the through-hole 210 to be coupled to the rotor core 200, and through which a cooling fluid flows in an interior thereof. The rotor shaft 100 may be coupled to the rotor core 200 to be rotated together with the rotor core 200.

In more detail, the rotor shaft 100 may include a shaft body 110, a cooling fluid hole part, and a support flange 130.

The shaft body 110 may have the hollow portion 111 in an interior thereof, and the hollow portion 111 may be formed long along a central axis of the shaft body 110. An oil inlet 112, through which the cooling fluid is introduced, is formed at one axial end of the shaft body 110, and the oil inlet 112 may be connected to the cooling fluid supply source (not illustrated).

The cooling fluid hole part may pass through the shaft body 110 to discharge the cooling fluid introduced into the hollow portion 111 to an outside of the shaft body 110. Furthermore, the cooling fluid hole part includes a plurality of cooling holes arranged to be spaced apart from each other along an axial direction of the shaft body 110.

The support flange 130 protrudes radially on an outer surface of the shaft body 110 to restrain axial movement of the rotor core 200 and has the passage communication hole 132.

In detail, the support flange 130 protrudes from an outer surface of the shaft body 110 and supports the rotor core 200 and plays a role to prevent axial movement of the rotor core 200. In addition, the support flange 130 according to the present disclosure has a passage that communicates with the cooling fluid part to cool the rotor core 200 or the stator 30.

The rotor core 200 further includes the rotor cooling passage 220. The rotor cooling passage 220 extends in an interior thereof in the axial direction of the rotor core 200, communicates with some of the plurality of cooling holes, and passes through the passage communication hole 132, and is configured such that the cooling fluid flows therethrough.

The rotor cooling passage 220 may extend from one axial end of the rotor core 200 toward an opposite axial end thereof. Furthermore, a plurality of rotor cooling passages 220 may be arranged along a circumferential direction of the rotor shaft 100. As an example, the rotor core 200 may include eight rotor cooling passages 220 arranged to be spaced apart from each other, but the number of the rotor cooling passages 220 is not limited thereto.

Here, the rotor core 200 may include a plurality of divided core bodies 200a that are stacked along the axial direction of the rotor core 200 and form the rotor cooling passage 220 in a state, in which the plurality of divided core bodies 200a are stacked. In detail, the rotor core 200 may have a structure, in which the plurality of divided core bodies 200a may be sequentially stacked along the axial direction of the rotor shaft 100. As an example, four divided core bodies 200a may be provided as in the illustrated example, but the present disclosure is not limited thereto. The rotor cooling passages 220 may extend along the axial direction of the shaft body 110 in a state, in which the plurality of divided core bodies 200a are assembled in the shaft body 110.

The support flange 130 may be interposed between adjacent ones 200a of the plurality of divided core bodies 200a.

For example, the support flange 130 may be disposed at a location corresponding to a central portion of the rotor core 200 in the axial direction. When the four divided core bodies 200a are provided as in the embodiment illustrated as an example, the support flange 130 may be disposed between two divided core bodies 200a. That is, the two divided core bodies 200a may be arranged on opposite axial sides while the support flange 130 is interposed therebetween.

The passage communication holes 132 provided in the support flange 130 may be arranged along the circumferential direction of the rotor shaft 100. Furthermore, the passage communication holes 132 may be provided at locations corresponding to the locations, at which the rotor cooling passages 220 are formed (see FIGS. 2, 4, and 8). For example, when the eight rotor cooling passages 220 are provided in the interior of the rotor core 200, eight passage communication holes 132 may be provided to the corresponding locations of the rotor cooling passages 220 of the support flange 130. Even when the support flange 130 is interposed between the two divided core bodies 200a, the rotor cooling passage 200 may communicate through the passage communication holes 132.

The cooling fluid hole part may include the first cooling hole 113 and the second cooling hole 114. Furthermore, the cooling fluid hole part may include the third cooling hole 115 and the fourth cooling hole 116.

The first cooling hole 113 may be formed at a location corresponding to one axial end of the rotor core 200, and may communicate with the rotor cooling passages 220. The first cooling hole 113 may be configured to supply the cooling fluid of the hollow portion 111 of the rotor shaft 100 to the rotor cooling passages 220.

The second cooling hole 114 is formed at an opposite side of the first cooling hole 113 to be spaced apart from the first cooling hole 113, and may be formed at a location corresponding to the support flange 130. The second cooling hole 114 may be configured to supply the cooling fluid of the hollow portion 111 of the rotor shaft 100 to the spaces between the plurality of divided core bodies 200a to cool the stator 30.

Here, a plurality of first cooling holes 113 and a plurality of second cooling holes 114 may be provided along the circumferential direction of the shaft body 110 to be spaced apart from each other. Here, four first cooling holes 113 and four second cooling holes 114 may be provided along the circumferential direction of the shaft body 110, but the present disclosure is not limited thereto. Meanwhile, the sizes of the first cooling holes 113 and the diameter of the second cooling holes 114 may be the same, but also may be different. For example, as illustrated in FIG. 4, the diameters of the first cooling holes 113 may be larger than the diameters of the second cooling holes 114.

In detail, the support flange 130 may include a support body 131 and a passage part 135.

The support body 131 forms the body of the support flange 130, and may protrude radially from the shaft body 110 and be interposed between the plurality of divided core bodies 200a to restrict axial movement of the rotor core 200. The support body 131 may has a plurality of passage communication holes 132.

The passage part 135 may be formed at a portion of the support body 131 to be cut, extend radially from the shaft body 110, and communicate with the second cooling holes 114.

The rotor core 200 may include a stator cooling passage 230. The stator cooling passage 230 may be provided between adjacent divided core bodies 200a, and may extend in a radial direction of the rotor shaft 100. Furthermore, the stator cooling passage 230 may be formed in an area including an area corresponding to the passage part 135, and may be configured such that the cooling fluid discharged through the second cooling holes 114 flows radially.

In detail, the passage part 135 may be formed at locations corresponding to the second cooling holes 114, and may form a flow passage, along which the cooling fluid discharged through the second cooling holes 114 flows. Furthermore, the flow passage may form a portion of the stator cooling passage 230. The stator cooling passage 230 is a passage formed in an interior of the rotor core 200 by the support flange 130, and is a passage for supplying the cooling fluid to an inside of the stator 30.

The stator cooling passage 230 may be provided a portion between adjacent divided core bodies 200a, at which the support flange 130 is interposed, and may extend in a radial direction of the shaft body 110. That is, the stator cooling passage 230 may be a passage that passes from the second cooling holes 114 through a space formed by the passage part 135 and extends to the inside of the stator 30.

In the embodiment of the present disclosure, the cooling fluid supplied to the hollow portion 111 of the rotor shaft 100 may be supplied to a middle portion of the inside of the stator 30 by providing the stator cooling passage 230, and accordingly, the stator 30 may be efficiently cooled. Further, because the stator cooling passage 230 is formed in the interior of the rotor core 200, it may additionally cool the rotor core 200 in a process of the cooling fluid flowing radially.

The cooling fluid hole part may include the third cooling hole 115 and the fourth cooling hole 116. The third cooling holes 115 may be formed on one side of the first cooling holes 113 to be spaced apart from each other, and the fourth cooling holes 116 may be formed between the first cooling holes 113 and the third cooling holes 115.

The third cooling hole 115 may be configured to supply the cooling fluid of the hollow portion 111 of the rotor shaft 100 to the bearing member 40, and may be formed at a location corresponding to the bearing member 40. The fourth cooling hole 116 may be configured to supply the cooling fluid of the hollow portion 111 to the coil part 50, and may be formed at a location corresponding to the one side coil end 51. Meanwhile, the sizes of the third cooling holes 115 and the diameters of the fourth cooling holes 116 may be the same, but also may be different. For example, as illustrated in FIG. 4, the diameters of the third cooling holes 115 may be larger than the diameters of the fourth cooling holes 116.

A plurality of third cooling holes 115 and a plurality of fourth cooling holes 116 may be provided along the circumferential direction of the shaft body 110 to be spaced apart from each other. Here, four third cooling holes 115 and four fourth cooling holes 116 may be provided along the circumferential direction of the shaft body 110, the present disclosure is not limited thereto.

In a direction that faces the one axial end of the shaft body 110 from the support flange 130, the second cooling holes 114, the first cooling holes 113, the fourth cooling holes 116, and the third cooling holes 115 may be sequentially formed.

For example, the shaft body 110 may include a rotor mounting part corresponding to a site, at which the rotor core 200 is assembled, a plate mounting part disposed on one side of the rotor mounting part and corresponding to a site, at which a first end plate 310 is assembled, a bearing mounting part corresponding to a site, at which the bearing member 40 is mounted, and a coil end arranging part disposed between the plate mounting part and the bearing mounting part and corresponding to a site, at which the one side coil end 51 is located.

Further, the first cooling holes 113 may be formed at a one axial end of the rotor mounting part, and the second cooling holes 114 may be formed at a central portion of the rotor mounting part in an axial direction of the shaft body 110. Furthermore, the third cooling holes 115 may be formed at the bearing mounting part, and the fourth cooling holes 116 may be formed in the coil end arranging part.

The rotor assembly 10 according to the embodiment of the present disclosure may include the first end plate 310 and a second end plate 320.

The first end plate 310 may be configured to cover one axial end of the rotor core 200. The second end plate 320 may be configured to cover an opposite axial end of the rotor core 200. For example, the first end plate 310 may be mounted on a rear side of the rotor assembly 10, and the second end plate 320 may be mounted on a front side of the rotor assembly 10.

In detail, the first end plate 310 may include an inlet hole 313 and a first passage groove 311.

The inlet hole 313 may be formed to communicates with the first cooling holes 113. For example, the inlet hole 313 may extend from an inner surface of the first end plate 310 toward a radial direction of the first end plate 310, and a plurality of inlet holes 313 may be formed to be spaced apart from each other in a circumferential direction of the first end plate 310. Because the inlet holes 313 are formed to correspond to the locations and the number of the first cooling holes 113, they may communicate with the first cooling holes 113.

The first passage groove 311 is concavely formed on a surface that faces the rotor core 200 of the first end plate 310 and is formed along the circumferential direction of the rotor shaft 100, and may be connected to the inlet holes 313 and may communicate with the rotor cooling passages 220. For example, the first passage groove 311 may have a ring shape that connects the plurality of inlet holes 313.

Accordingly, the cooling fluid discharged from the first cooling holes 113 may be introduced into the first passage groove 311 through the inlet holes 313, and the cooling fluid introduced into the first passage groove may be introduced into the rotor cooling passage 220.

Meanwhile, the second end plate 320 will be described in detail with reference to FIGS. 9 to 12. Hereinafter, for convenience of description, the surface that faces the rotor core 200 of the second end plate 320 will be referred to as a first surface and an opposite surface to the first surface will be referred to as a second surface.

The second end plate 320 may include a second passage groove 321 and a discharge hole 323.

The second passage groove 321 is concavely formed on the first surface of the second end plate 320 and is formed along the circumferential direction of the rotor shaft 100, and may communicate with the rotor cooling passages 220. The discharge hole 323 may be formed to pass between the second passage groove 321 and the second surface to discharge to the cooling fluid introduced into the second passage groove 321.

In detail, the second passage groove 321 may be formed on the first surface in a ring shape to connect ends of the plurality of rotor cooling passages 220. Furthermore, a plurality of discharge holes 323 may be formed along a circumferential direction of the second end plate 320 to be spaced apart from each other.

Accordingly, the cooling fluid that flows in the rotor cooling passages 220 may be introduced into the second passage groove 321, and the cooling fluid introduced into the second passage groove 321 may be discharged to the opposite side coil end 52 through the discharge hole 323. In the embodiment of the present disclosure, because the second end plate 320 includes the second passage groove 321 and the discharge hole 323 that communicate with the rotor cooling passage 220, the cooling fluid introduced into the hollow portion 111 of the rotor shaft 100 may be guided to the opposite side coil end 52 to directly cool the coil part 50.

Here, the discharge hole 323 may be formed to be inclined to be farther away from the rotor shaft 100 as it goes in a direction that faces the second surface from the second passage groove 321.

Referring to FIGS. 11 and 12, because the discharge hole 323 is formed to be inclined to be farther away from the rotor shaft 100, the cooling fluid discharged through the discharge hole 323 may be ejected to an opposite end of the opposite side coil end 52. In this way, because the discharge hole 323 is formed to be inclined toward the end of the opposite side coil end 52 from the second passage groove 321, the opposite side coil end 52 may be cooled more effectively.

In detail, a temperature of the coil part 50 becomes higher as it goes to the one side coil end 51 and the opposite side coil end 52, and becomes higher as it goes to an axial end of the opposite side coil end 52. However, when the discharge hole 323 is formed in a form that extends radially from the second passage groove 321 instead of in a form that is inclined toward the second surface, the cooling fluid is not directly ejected to the opposite side of the opposite side coil end 52 so that the cooling effect of the opposite side of the opposite side coil end 52 may be relatively low. In this case, the cooling fluid discharged from the discharge hole 323 may be ejected to an area of the coil part 50 at a location corresponding to the second end plate 320. Meanwhile, in the embodiment of the present disclosure, because the discharge hole 323 is formed toward the second surface and is formed to be inclined to be farther from the rotor shaft as it goes toward the second surface, the cooling fluid is directly ejected to the opposite side coil end 52, thereby increasing the cooling rate.

Meanwhile, flows of the cooling fluid discharged from the plurality of cooling holes of the cooling fluid hole part will be described with reference to the illustrated embodiment.

First, the cooling fluid supplied from a cooling fluid supply source may be introduced into the hollow portion 111 through the oil inlet 112 formed on one side of the shaft body 110. The introduced cooling fluid may flow from one side of the axial direction of the shaft body 110 in a direction that faces the opposite side.

A portion of the introduced cooling fluid may be discharged through the third cooling holes 115 and may be ejected to the bearing member 40. Accordingly, the cooling fluid may function as a lubricant of the bearing member 40 and may directly cool the bearing member 40 as well.

Furthermore, a portion of the cooling fluid may be discharged through the fourth cooling holes 116, and may be ejected to the one side coil end 51 by a rotational force when the rotor shaft 100 is rotated. Accordingly, the one side coil end 51 may be directly cooled by the cooling fluid.

Furthermore, a portion of the cooling fluid may be discharged through the first cooling holes 113, and may be introduced into the rotor cooling passages 220 through the inlet holes 313 and the first passage groove 311. Accordingly, the rotor core 200 may be directly cooled by the cooling fluid. The cooling fluid that passed through the rotor cooling passage 220 may be discharged toward the opposite side coil end 52 through the second passage groove 321 and the discharge holes 323 of the second end plate 320. Accordingly, the opposite side coil end 52 may be directly cooled by the cooling fluid.

Furthermore, a portion of the cooling fluid may be discharged through the second cooling holes 114, and may be introduced into the passage part 135 of the support flange 130 and the stator cooling passage 230. The cooling fluid introduced into the stator cooling passage 230 may flow in a direction that faces an inner surface of the stator 30 through the rotational force when the rotor shaft 100 is rotated, and accordingly, a middle area of the stator 30 may be directly cooled by the cooling fluid. Then, in the flowing process of the cooling fluid introduced into the stator cooling passage 230, the rotor core 200 may be additionally cooled.

In this way, according to the embodiment of the present disclosure, through an improvement of the structures of the rotor core 200 and the rotor shaft 100, parts that are difficult to be directly cooled by an existing oil cooling system may be directly cooled without adding a separate component.

Accordingly, the motor according to the embodiment of the present disclosure may increase the efficiency of the motor 1 by improving cooling efficiency. Further, because a magnet mounted on the rotor core 200 may be cooled through efficiency cooling of the rotor core 200, the specification of a magnet may be lowered, and accordingly, an effect of reducing manufacturing costs may be achieved.

Furthermore, according to the embodiment of the present disclosure, because the one side coil end 51 and the opposite side coil end 52 may be directly cooled by the fourth cooling holes 116 and the second end plate 320, installation of a circular oil pipe, which is conventionally installed for cooling, and machining of a housing for achieving the installation may be omitted. Accordingly, the number of components may be reduced and the housing machining process may be omitted, and thus an effect of reducing manufacturing costs may be achieved.

In this way, the rotor assembly and the motor including the same according to the present disclosure, through an improvement of the structures of the rotor core and the rotor shaft without adding a separate component, may directly cool parts that are difficult to be directly cooled by an existing oil cooling system.

Accordingly, the motor according to the embodiment of the present disclosure may increase the efficiency of the motor by improving cooling efficiency. In addition, because a magnet mounted on the rotor core may be cooled through efficiency cooling, the specification of a magnet may be lowered, and accordingly, an effect of reducing manufacturing costs may be achieved.

Although the specific embodiments of the present disclosure have been described until now, the spirit and scope of the present disclosure are not limited to the specific embodiments, and may be variously corrected and modified by an ordinary person in the art, to which the present disclosure pertains, without changing the essence of the present disclosure claimed in the claims.

What is claimed is:

1. A rotor assembly comprising:
a rotor core having a through-hole disposed at a central portion thereof along an axial direction of the rotor core; and
a rotor shaft configured to pass through the through-hole and coupled to the rotor core,
wherein the rotor shaft includes:
a shaft body having a hollow portion in an interior thereof;
a cooling fluid hole part including a plurality of cooling holes passing through the shaft body to discharge a cooling fluid introduced through the hollow portion to an outside of the shaft body, the plurality of cooling holes being arranged to be spaced apart from each other along an axial direction of the shaft body; and
a support flange protruding radially on an outer surface of the shaft body to restrain axial movement of the rotor core and having a passage communication hole, and
wherein the rotor core includes:
a rotor cooling passage extending in the axial direction of the rotor core, communicating with some of the plurality of cooling holes, configured to pass through the passage communication hole, and configured such that the cooling fluid flows therethrough,
wherein the support flange includes:
a support body having the passage communication hole; and
a plurality of passage parts, spaced apart from one another in a circumferential direction of the rotor shaft, each of the passage parts having a cut shape at a portion of the support body and extending radially from the shaft body to communicate with some of the plurality of cooling holes,
wherein the passage communication hole is disposed between adjacent ones of the passage parts in the circumferential direction of the rotor shaft.

2. The rotor assembly of claim 1, wherein the rotor core includes:
a plurality of divided core bodies stacked along the axial direction of the rotor core and configured to form the rotor cooling passage in a state in which the plurality of divided core bodies are stacked, and
wherein the support flange is interposed between adjacent ones of the plurality of divided core bodies.

3. The rotor assembly of claim 2, wherein the cooling fluid hole part includes:
first cooling holes disposed at locations corresponding to one axial end of the rotor core and communicating with the rotor cooling passage; and
second cooling holes disposed at an opposite side of the first cooling holes, spaced apart from the first cooling holes, and disposed at a location corresponding to the support flange.

4. The rotor assembly of claim 3,
wherein the rotor core further includes:
a stator cooling passage extending radially between the adjacent ones of the plurality of divided core bodies, disposed in an area corresponding to the passage part, and configured such that the cooling fluid discharged through the second cooling holes flows radially.

5. The rotor assembly of claim 3, further comprising:
a first end plate configured to cover the one axial end of the rotor core; and
a second end plate configured to cover an opposite axial end of the rotor core.

6. The rotor assembly of claim 3, wherein the first cooling holes are spaced apart from one another along a circumferential direction of the shaft body, and
the second cooling holes are spaced apart from one another along the circumferential direction of the shaft body.

7. The rotor assembly of claim 3, wherein the cooling fluid hole part includes:
third cooling holes disposed on one side of the first cooling holes, spaced apart from the first cooling holes; and
fourth cooling holes disposed between the first cooling holes and the third cooling holes.

8. The rotor assembly of claim 7, wherein the third cooling holes are spaced apart from one another along a circumferential direction of the shaft body, and
the fourth cooling holes are spaced apart from one another along the circumferential direction of the shaft body.

9. A rotor assembly comprising:
a rotor core having a through-hole disposed at a central portion thereof along an axial direction of the rotor core;
a rotor shaft configured to pass through the through-hole and coupled to the rotor core;
a first end plate configured to cover the one axial end of the rotor core; and
a second end plate configured to cover an opposite axial end of the rotor core,
wherein the rotor shaft includes:
a shaft body having a hollow portion in an interior thereof;
a cooling fluid hole part including a plurality of cooling holes passing through the shaft body to discharge a cooling fluid introduced through the hollow portion to an outside of the shaft body, the plurality of cooling holes being arranged to be spaced apart from each other along an axial direction of the shaft body; and
a support flange protruding radially on an outer surface of the shaft body to restrain axial movement of the rotor core and having a passage communication hole, and
wherein the rotor core includes:
a rotor cooling passage extending in the axial direction of the rotor core, communicating with some of the plurality of cooling holes, configured to pass through the passage communication hole, and configured such that the cooling fluid flows therethrough,
wherein the cooling fluid hole part includes:
first cooling holes disposed at locations corresponding to one axial end of the rotor core and communicating with the rotor cooling passage; and
second cooling holes disposed at an opposite side of the first cooling holes, spaced apart from the first cooling holes, and disposed at a location corresponding to the support flange, and
wherein the first end plate includes:
an inlet hole communicating with the first cooling holes; and
a first passage groove having a concave shape on a surface of the first end plate that faces the rotor core, disposed along a circumferential direction of the rotor shaft, connected to the inlet hole, and communicating with the rotor cooling passage.

10. The rotor assembly of claim 5, wherein the second end plate includes a first surface, which faces the rotor core, and a second surface, which is an opposite surface to the first surface, and
wherein the second end plate includes:
a second passage groove having a concave shape on the first surface of the second end plate, disposed along the circumferential direction of the rotor shaft, and communicating with the rotor cooling passage; and
a discharge hole penetrating the second end plate and extending between the second passage groove and the second surface to discharge the cooling fluid introduced into the second passage groove.

11. The rotor assembly of claim 10, wherein the discharge hole is inclined to be farther away from the rotor shaft as the discharge hole extends from the second passage groove in a direction toward the second surface.

12. A motor comprising:
a housing;
a stator disposed in an interior of the housing; and
a rotor assembly housed on an inside of the stator to be rotatable,
wherein the rotor assembly includes:
a rotor core having a through-hole disposed at a central portion thereof along an axial direction of the rotor core; and
a rotor shaft configured to pass through the through-hole and coupled to the rotor core,
wherein the rotor shaft includes:
a shaft body having a hollow portion in an interior thereof;
a cooling fluid hole part including a plurality of cooling holes passing through the shaft body to discharge a cooling fluid introduced through the hollow portion to an outside of the shaft body, the plurality of cooling holes being arranged to be spaced apart from each other along an axial direction of the shaft body; and
a support flange protruding radially on an outer surface of the shaft body to restrain axial movement of the rotor core and having a passage communication hole, and
wherein the rotor core includes a rotor cooling passage extending in the axial direction of the rotor core, communicating with some of the plurality of cooling holes, configured to pass through the passage communication hole, and configured such that the cooling fluid flows therethrough,
wherein the support flange includes:
a support body having the passage communication hole; and
a plurality of passage parts, spaced apart from one another in a circumferential direction of the shaft body, each of the passage parts having a cut shape at a portion of the support body and extending radially from the shaft body to communicate with some of the plurality of cooling holes,
wherein the passage communication hole is disposed between adjacent ones of the passage parts in the circumferential direction.

13. The motor of claim 12,
wherein the rotor core further includes:
a plurality of divided core bodies stacked along the axial direction of the rotor core and configured to form the rotor cooling passage in a state, in which the plurality of divided core bodies are stacked, and
a stator cooling passage extending radially between adjacent ones of the plurality of divided core bodies, disposed in an area corresponding to the passage part, and configured such that the cooling fluid discharged through some of the cooling holes flows radially.

14. The motor of claim 12, further comprising:
a coil part disposed in an interior of the stator,
wherein some of the plurality of cooling holes are disposed at a location corresponding to one end of the coil part, and
wherein the cooling fluid flowing through the rotor cooling passage is discharged toward an opposite end of the coil part.

15. The motor of claim 12, further comprising:
a bearing member mounted on one end of the rotor shaft, and
wherein some of the plurality of cooling holes are disposed at a location corresponding to the bearing member.

* * * * *